United States Patent
Shorty et al.

(10) Patent No.: US 12,028,743 B2
(45) Date of Patent: Jul. 2, 2024

(54) SCALING TRAFFIC IN A USER AWARE WIRELESS CONTROL NETWORK

(71) Applicant: Silicon Laboratories Inc., Austin, TX (US)

(72) Inventors: Peter Shorty, Valby (DK); Esben Østergård, Frederiksberg (DK)

(73) Assignee: Silicon Laboratories Inc., Austin, TX (US)

( * ) Notice: Subject to any disclaimer, the term of this patent is extended or adjusted under 35 U.S.C. 154(b) by 43 days.

(21) Appl. No.: 16/916,202

(22) Filed: Jun. 30, 2020

(65) Prior Publication Data

US 2021/0410003 A1 Dec. 30, 2021

(51) Int. Cl.
*H04W 28/02* (2009.01)

(52) U.S. Cl.
CPC ... *H04W 28/0284* (2013.01); *H04W 28/0289* (2013.01)

(58) Field of Classification Search
CPC ..... H04L 45/50; H04L 45/04; H04L 12/4641; H04L 45/02; H04L 12/66; H04L 45/00; H04L 63/0272; H04L 69/18; H04W 88/16; H04W 84/18; H04W 48/18; H04W 24/02; H04W 28/00
See application file for complete search history.

(56) References Cited

U.S. PATENT DOCUMENTS

| | | | | |
|---|---|---|---|---|
| 2017/0134536 A1* | 5/2017 | Tessiore | ................. | H04L 69/18 |
| 2017/0264509 A1* | 9/2017 | Wanser | ................. | H04L 43/08 |
| 2018/0092151 A1* | 3/2018 | Liu | ................. | H04W 24/02 |
| 2018/0120796 A1* | 5/2018 | Tegnell | ................. | G05B 15/02 |
| 2019/0296969 A1* | 9/2019 | Zimny | ................. | H04L 41/28 |
| 2020/0374357 A1* | 11/2020 | Smith | ................. | H04W 4/80 |

OTHER PUBLICATIONS

Naomi Ramos, et al., "A Device and Network-Aware Scaling Framework for Efficient Delivery of Scalable Video Over Wireless Networks," The 18th Annual IEEE International Symposium on Personal, Indoor and Mobile Radio Communications (PIMRC'07), 2007, 5 pages total.

* cited by examiner

*Primary Examiner* — Khaled M Kassim
*Assistant Examiner* — Najeeb Ansari
(74) *Attorney, Agent, or Firm* — Trop, Pruner & Hu, P.C.

(57) ABSTRACT

In an embodiment, a gateway includes: a radio circuit having a plurality of wireless protocol circuits, each to communicate wirelessly with one or more nodes present in a wireless network; an interface circuit to couple to one or more cloud-based devices via another network; and a controller coupled to the interface circuit. The controller may include a control circuit to control the wireless network, where in response to detection of an active user interface for the wireless network, the control circuit may dynamically update a status report messaging level of at least some of a plurality of nodes present in the wireless network.

16 Claims, 3 Drawing Sheets

SCALING TRAFFIC IN A USER AWARE WIRELESS CONTROL NETWORK

BACKGROUND

Wireless control networks typically have a limited bandwidth and a large number of nodes. When trying to maintain an accurate state of the network in a central controller, the network can easily be saturated by status messages from the nodes to the controller and messages from the controller polling nodes for status. This situation prevents control messages from the controller to be send to the nodes in the network and creates a poor user experience because of long latency when controlling nodes.

SUMMARY OF THE INVENTION

In one aspect, a gateway includes: a radio circuit having a plurality of wireless protocol circuits, each to communicate wirelessly with one or more nodes present in a wireless network; an interface circuit to couple to one or more cloud-based devices via another network; and a controller coupled to the interface circuit. The controller may include a control circuit to control the wireless network. In response to detection of an active user interface for the wireless network, the control circuit may dynamically update a status report messaging level of at least some of a plurality of nodes present in the wireless network.

In an example, the control circuit is to dynamically update the status report messaging level of the at least some of the plurality of nodes to a maximum level in response to the detection of the active user interface being remotely located from the wireless network. The control circuit may dynamically update the status report messaging level of the at least some of the plurality of nodes to a second level less than the maximum level in response to the detection of the active user interface being present within the wireless network. The control circuit also may dynamically update the status report messaging level of the at least some of the plurality of nodes to a minimum level when no active user interface is detected.

In an example: at the maximum level, the controller is to poll the at least some of the plurality of nodes for status information at a first rate; at the second level, the controller is to poll the at least some of the plurality of nodes for status information at a second rate less than the first rate; and at the minimum level, the controller does not poll the at least some of the plurality of nodes for status information.

In an example, the control circuit comprises a network configuration circuit to send a control message to dynamically update the status report messaging level. The control message may include a first value to indicate a rate for status report messaging.

The control circuit further may include an update configuration circuit, when no active user interface is detected, to cause an update to a firmware of at least one of the plurality of nodes, and to prevent the firmware update when the active user interface is detected.

In an example, in response to a command from the active user interface, the controller is to send a control message to a first node of the plurality of nodes to cause an operation in the first node. The control message is to be received in the first node with a reduced latency due to the dynamic update to the status report messaging level.

In an example, the control circuit is to dynamically update the status report messaging level of the at least some of the plurality of nodes in response to a request from a rules engine, based on a trigger condition. In response to a command from the rules engine, the controller is to send a control message to a first node of the plurality of nodes to cause an operation in the first node, where the control message is to be received in the first node with a reduced latency due to the dynamic update to the status report messaging level.

In another aspect, a method, which when performed by a network controller causes the network controller to: identify, in the network controller of a wireless network, an active user interface connected to the network controller; and in response to identifying the active user interface, send control messages to a plurality of devices of the wireless network to cause the plurality of devices to update a rate of status messaging reporting, where the rate of status messaging reporting is to be at a first level when the active user interface is present within the wireless network and at a second level when the active user interface is remote from the wireless network, the second level higher than the first level.

The method may further include: identifying a lack of the active user interface connected to the network controller; and in response to identifying the lack of the active user interface, sending second control messages to the plurality of devices to cause the plurality of devices to update the rate of status messaging reporting to a minimum level. The method may further include: in response to identifying the lack of the active user interface, preventing sending poll requests to the plurality of devices. The method may further include: in response to identifying the lack of the active user interface, performing a firmware update to at least one of the plurality of devices. The method may further include: receiving an acknowledgment from a first device to acknowledge receipt of one of the control messages, and updating a status table in response to the acknowledgment. The method may further include: sending another control message to a second device to cause the second device to update the rate of status messaging reporting, in absence of an acknowledgment from the second device of one of the control messages.

In yet another aspect, a system includes a network controller and a plurality of devices. The network controller may include: a radio circuit having a plurality of wireless protocol circuits, each to communicate wirelessly with one or more of a plurality of devices; an interface circuit to remotely couple to one or more cloud-based devices; and a controller coupled to the interface circuit. The controller may include a control circuit to control a wireless network, where in response to detection of an active user interface for the wireless network, the control circuit is to send a rate control message to at least some of the plurality of devices to cause a dynamic update to a status messaging level of the at least some of the plurality of devices, to prioritize control messaging over status messaging.

In turn, the plurality of devices may be wirelessly coupled to the network controller. At least some of the plurality of devices comprise a configuration storage to store status message configuration information and are to update the status message configuration information in the configuration storage in response to the rate control message, and update the status messaging level according to the updated status message configuration information.

In an example, the control circuit comprises an update configuration circuit, when no active user interface is detected, to cause an update to a firmware of at least one of the plurality of devices, and to prevent the firmware update when the active user interface is detected. In response to a command from the active user interface, the controller is to send a control message to a first device of the plurality of devices to cause an operation in the first device, where the control message is to be received in the first device with a reduced latency due to the dynamic update to the status messaging level.

DETAILED DESCRIPTION

In various embodiments, a network controller for a wireless network such as a wireless automation network or other wireless control network, may be configured to dynamically control nodes of the wireless network to provide status reports at a controllable rate based at least in part on detection of an active user interface. In this way, reduced latency of providing updated status information to a user via the active user interface may be realized. Still further, in situations in which the user and the active user interface are present within the wireless network, such control also may enable reduced latency of communicating user commands, e.g., via the user interface, to nodes within the wireless network to control their operation. In this way, embodiments may dynamically prioritize control messaging over status messaging. Furthermore, by providing dynamic rate-based reporting control, power consumed within the nodes may be reduced, which may be particularly useful in the context of battery-powered devices.

Figure 1:
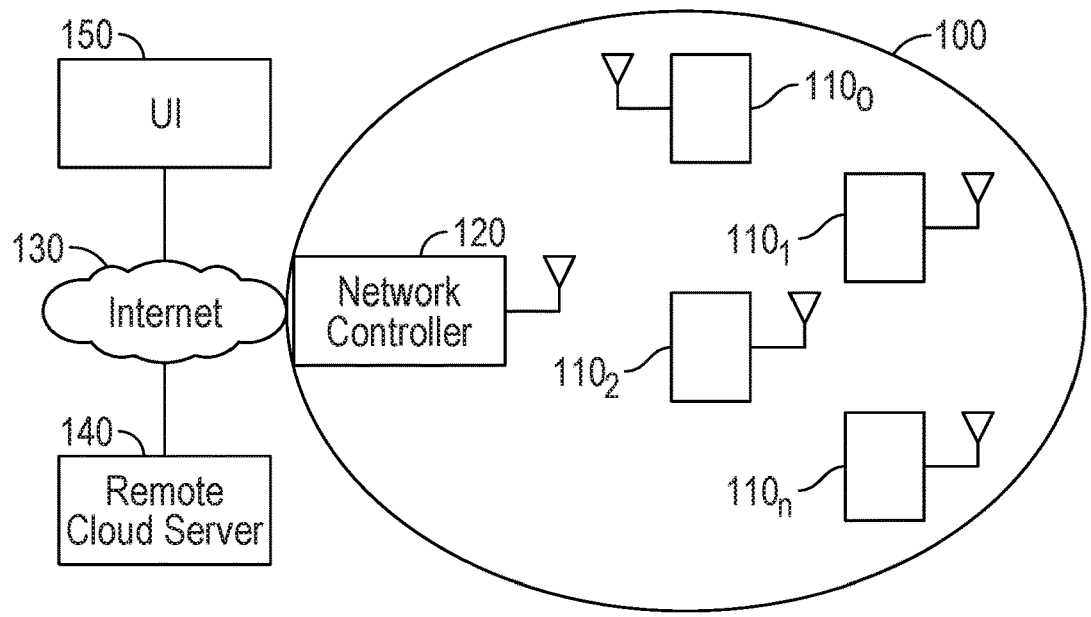
FIG. 1 is a block diagram of a representative wireless automation network in accordance with an embodiment.

Referring now to FIG. 1, shown is a block diagram of a representative wireless automation network in accordance with an embodiment. As shown in FIG. 1, network 100 may be implemented as a mesh network in which various nodes 110 ($110_{0-n}$) communicate with each other and also may communicate messages along from a particular source node to a given destination node. Such message-based communication also may be realized between various nodes 110 and a network controller 120.

Understand while shown at a very high level in FIG. 1, network 100 may take many forms other than a mesh network. For example, in other cases a star network, a point-to-point network or other network topologies may be possible. Furthermore, while generic nodes 110 are shown for ease of illustration, understand that many different types of nodes may be present in a particular application. For example, in the context of a home automation system, nodes 110 may be of many different types. As examples, nodes 110 may include sensors, lighting components, door locks or other actuators, HVAC components, security components, window coverings, and possibly entertainment components, or other interface devices to enable control of such components via network 100. Of course in different implementations additional or different types of nodes may be present.

In addition, different nodes 110 may communicate according to different wireless communication protocols. As examples, representative communication protocols may include Bluetooth, Zigbee, Z-Wave, and Thread, among other possible wireless communication protocols. In some cases, certain nodes may be capable of communicating according to multiple communication protocols, while other nodes only may be capable of communicating by a given one of the protocols. Within network 100, certain nodes 110 may communicate with other nodes of the same communication protocol, either for providing direct message communication or for realizing mesh-based communications with network controller 120 or other components. In other instances, e.g., for certain Bluetooth devices, communications may be directly between a given node 110 and network controller 120.

As such in the embodiment of FIG. 1, network controller 120 may be implemented as a multi-protocol universal gateway. Details of a representative gateway are described further below. Suffice to say, network controller 120 may be the primary controller within the network and may be configured to implement the dynamic rate control described herein. Furthermore, network controller 120 may perform operations to set up the network and enable communication between different nodes and update such set up as devices enter and leave network 100.

In addition, network controller 120 further may be an interface to interact with remote devices such as cloud-based devices. To this end, network controller 120 further may communicate, e.g., via the Internet with a remote cloud server 140. As also shown, one or more user interfaces 150 that can be used to interact with network 100 may be located remotely and may communicate with network controller 120 via the Internet 130. As examples, such user interfaces 150 may be implemented within a mobile device such as a smartphone, tablet computer or so forth of a user authorized to access network 100. For example, the user may be a homeowner of a home in which wireless network 100 is implemented as a home automation network. In other cases, the user may be an authorized employee such as an IT individual, a maintenance individual or so forth who uses remote user interface 150 to interact with network 100, e.g., in the context of a building automation network. Understand that many other types of automation networks, such as an industrial automation network, a smart city network, agricultural crop/livestock monitoring network, environmental monitoring network, store shelf label network, asset tracking network, or health monitoring network, among others also may leverage embodiments as described herein.

Figure 2:
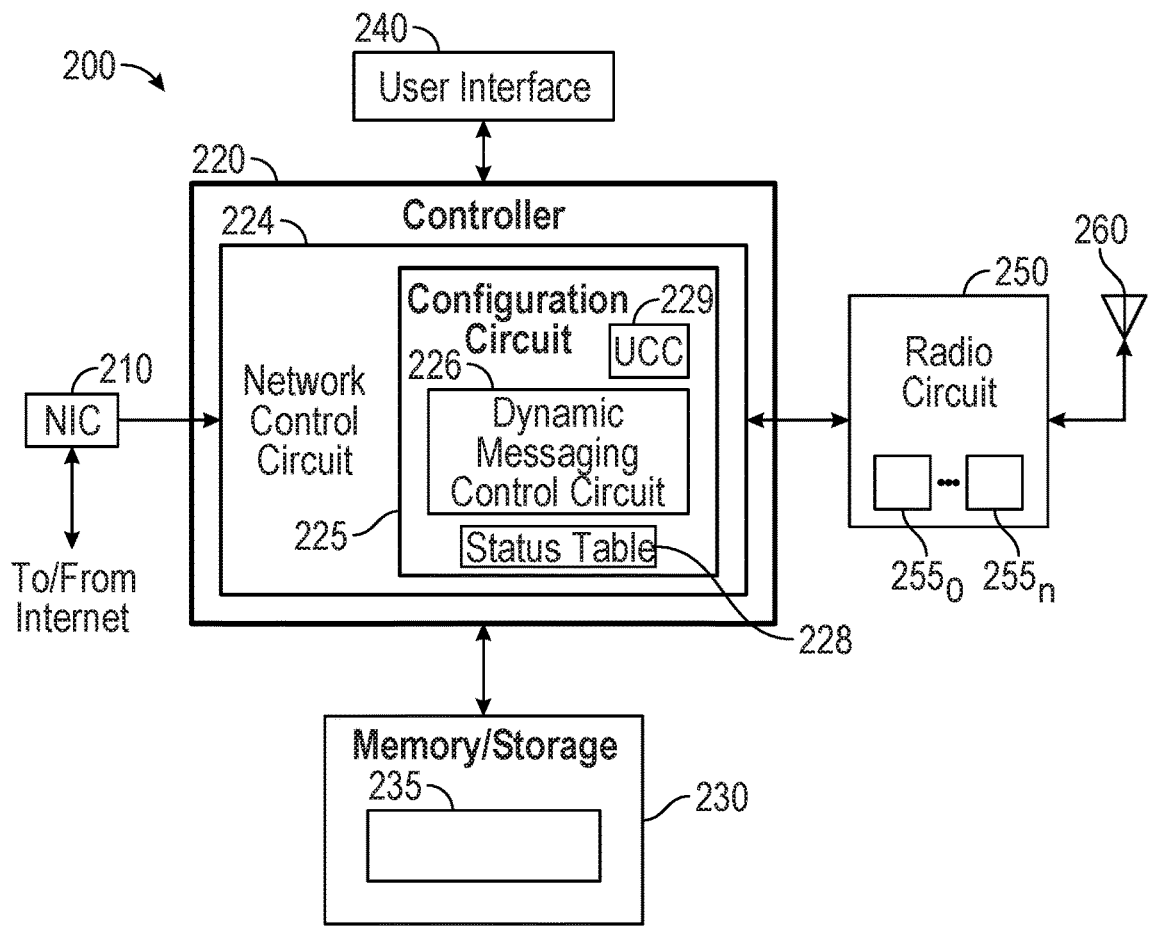
FIG. 2 is a block diagram of a universal gateway in accordance with an embodiment.

Referring now to FIG. 2, shown is a block diagram of a universal gateway in accordance with an embodiment. As shown in FIG. 2, gateway 200 is a computing device that acts as a network controller for a wireless network such as a given automation or control network. In addition, gateway 200 may act as an interface and/or router to enable communication with remote components, e.g., via the Internet. For example, gateway 200 may communicate with one or more cloud-based servers that may implement a rules-based engine for controlling one or more devices within the wireless network.

In the high level shown in FIG. 2, gateway 200 includes a network interface circuit (NIC) 210 that is an interface circuit to connect gateway 200 to remote systems. As examples, these systems may include cloud-based servers as just discussed. In addition, one or more user interfaces may remotely connect to the wireless network via the Internet and NIC 210.

As further shown, NIC 210 couples to a controller 220. In an embodiment, controller 220 may be a microcontroller (MCU) that acts as a main processing circuit of gateway 200. In the high level shown in FIG. 2, controller 220 includes a network control circuit 224, which may control various operations within a wireless network. As shown, network control circuit 224 may include a configuration circuit 225. Configuration circuit 225 may operate to control a configuration of the wireless network, as well as devices within the network. As further shown, configuration circuit 225 may include a dynamic messaging control circuit 226.

In embodiments herein, dynamic messaging control circuit 226 may, based at least in part on identification of connection of a user interface, dynamically control messaging activity within the wireless network. For example as described herein, status report messaging may be dynamically controlled to occur at different rates depending upon presence of an active user interface. Understand of course that additional dynamic messaging control may be realized, both based on detection of an active user interface as well as based on other trigger conditions. As examples, such trigger conditions may include detection of activity within the wireless network, such as motion of a person, environmental conditions such as sunlight conditions or so forth, among others. Trigger conditions also may include local activation of nodes in the network by a user, change in environment such as a rise in carbon dioxide level, time of day, user patterns learned by the system with machine learning, or other such trigger conditions.

To determine whether certain control messages have been received by relevant devices within the wireless network, a status table 228 may be used. More specifically, status table 228 may include multiple entries each associated with a given device within the wireless network. When a command message such as for updating status report messaging rate is sent, a flag in an entry may be set. This flag can later be cleared when an acknowledgment of this command is received from the device. In the absence of such acknowledgment, the set flag may cause a re-sending of the relevant command message, in some cases. For example, after sending control messages to cause messaging rate changes, dynamic messaging control circuit 226 may access status table 228 to identify one or more devices that did not acknowledge the control message. For these devices, another control message may be sent.

Also shown in FIG. 2, configuration circuit 225 may further include an update control circuit 229. Update control circuit 229 may receive information, e.g., from the cloud, to indicate when one or more devices, e.g., a given class of devices within the wireless network requires an update, such as a firmware update or so forth. Leveraging similar techniques described herein for dynamic messaging control, update control circuit 229 may cause these updates to occur when a lack of activity is detected within the wireless network based on lack of active user interfaces.

Update control circuit 229 also may be configured to perform maintenance tasks when such lack of activity is detected. For example, network maintenance, e.g., to update routing tables or so forth based on changes in available devices, may occur in these detected periods of inactivity. Note that in different use cases, such maintenance activity may occur at the gateway level as well as potentially within individual devices. Thus with embodiments herein, update control circuit 229 may issue update or maintenance commands to devices within the wireless network such that these operations may occur when lack of activity is detected.

Note that the implementation shown in FIG. 2 of a controller such as an MCU including internal network control circuitry, configuration circuitry, dynamic messaging control circuitry and update control circuitry, is for example and identification purposes. Understand that in other cases, dedicated hardware circuitry may be present for these different control circuits. In still further cases, controller 220 or another MCU or other processor may execute instructions stored in a non-transitory storage medium. In an embodiment, these instructions may be implemented as a control program to perform the dynamic messaging control described herein.

As further shown in FIG. 2, controller 220 also couples to a memory/storage 230, which may take the form of dynamic random access memory and one or more non-transitory storage media, such as a flash memory. Storage 230 may store an operating system, firmware and other programs such as one or more rules engines to perform automation tasks within a network based on trigger conditions. In an embodiment, a control program 235, also stored in non-transitory storage, may include program code that when executed by controller 220 performs status report messaging control as described herein. Still with reference to FIG. 2, an optional user interface 240 may be present. The user interface may include a touchscreen display, to enable a user to view the status of various devices within the wireless network, as well as to provide user commands, e.g., for making configuration changes and entering or modifying local rules.

To enable communication with devices of different wireless communication protocols, a radio circuit 250 may include multiple protocol radio circuits $255_0$-$255_n$. The protocol radio circuits 255 may include physical layer and other radio circuitry each for a given wireless protocol. In turn, radio circuit 250 couples to an antenna 260 to provide wireless communication within a wireless network. Understand while shown at this high level in the embodiment of FIG. 2, many variations and alternatives are possible.

Figure 3:
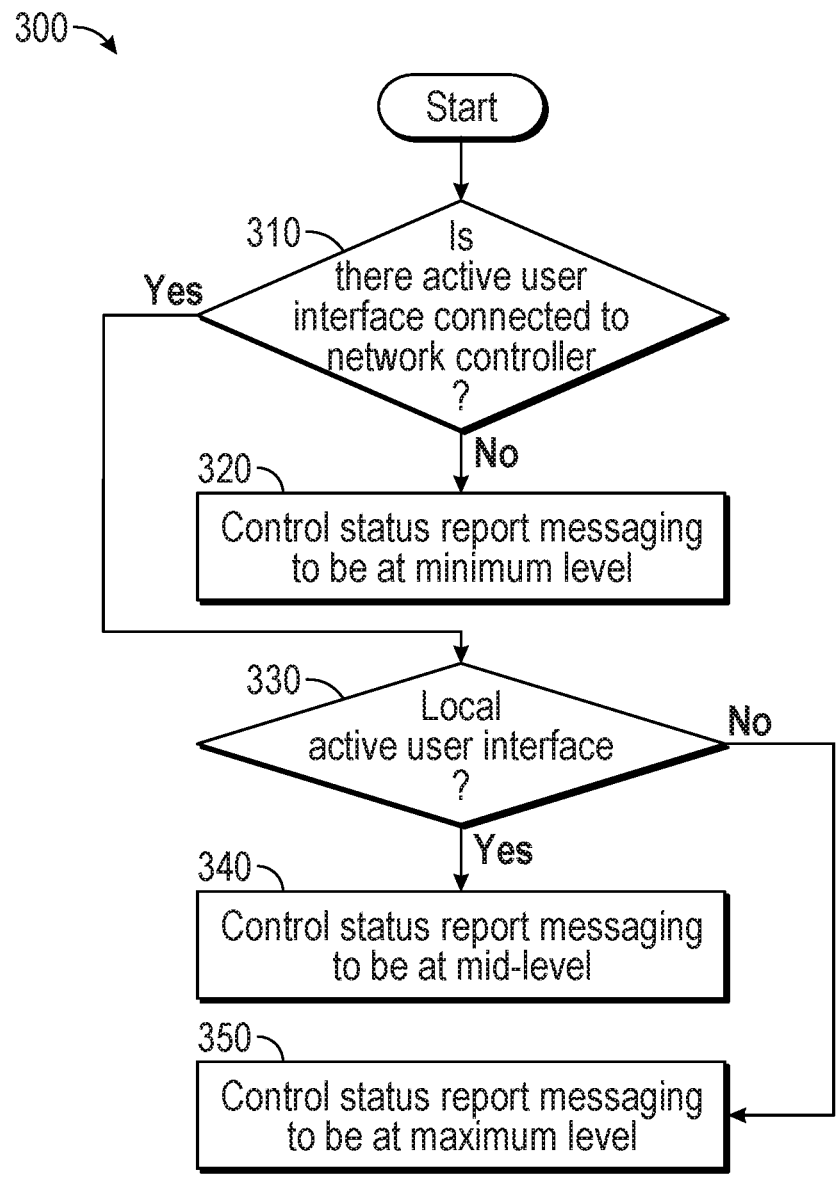
FIG. 3 is a flow diagram of a method in accordance with an embodiment.

Referring now to FIG. 3, shown is a flow diagram of a method in accordance with an embodiment. As shown in FIG. 3, method 300 is a method for controlling nodes of a network for dynamic communication rates as described herein. In an embodiment, method 300 may be performed within a network controller such as a universal protocol gateway, e.g., as described above in FIG. 2. As another example, method 300 may be performed by a cloud service in execution on a cloud server. Accordingly, method 300 may be performed by hardware circuitry, firmware, software and/or combinations thereof.

At a high level, method 300 may be used to dynamically detect presence of an active user interface and control status communication rates based at least in part on this detection. As shown, method 300 begins by determining whether there is an active user interface connected to the network controller (diamond 310). As one example, this detection of an active user interface may be in response to an operating system of the network controller receiving a request from a user interface. Such request may be a login request to the network in connection with an update to a status of one or more of devices within the network. Or it may be a request to perform a control operation with respect to one of the devices. Note that in different embodiments, these user interfaces may take various forms, such as a dedicated controller, a user interface that is part of the network controller itself, a smartphone, a remote control device or other user interface.

If it is determined that there is no active user interface, control passes to block 320. At block 320 status report messaging may be controlled to be sent at a minimum level. Different examples of status report messaging are possible in different implementations. As representative examples, some devices may be configured to provide status reports in response to polling requests received from a requester (e.g., the network controller). Instead other devices may be configured to provide status reports without polling. For example, certain devices may be configured to provide status reports, e.g., according to a predetermined schedule, which may vary depending upon device. Other devices may be configured to provide status reports when device state changes or so forth. For example, each device may be differently configured based on a policy appropriate for the type of device to provide status reports according to different time intervals, device state, among other examples.

Understand that this minimal level of status reporting may vary for a given implementation. However, with different levels of status reporting described herein this minimum level corresponds to a lowest level, meaning that devices provide status reports at a lowest level of available levels for the different detection modes. This lowest level, in one embodiment, may be implemented by instructing devices to only communicate a status report if there is a change in state. Otherwise, in this mode where there are no active user interfaces, no status messages are communicated from the devices. Further as part of this minimum level mode, a network controller may stop issuing polling requests, such that devices that only provide status messages in response to a polling request will not provide any status reporting.

Thus in this mode with no active user interface, the amount of status messaging within the network may be reduced. Such reduction in status messaging may allow battery-powered devices to reduce their power consumption. For example, assume a battery-powered sensor is configured to periodically wake up and report status. With this control of status reporting to be at a minimal level, e.g., only on state change, the need for this battery-powered sensor to continually power up solely for reporting status is avoided.

Note that to effect this change in status reporting, a network controller may send control messages to the devices in the network as unicast messages. In some cases specific (and varied) messages may be sent to each device. In other cases it may be possible to send a broadcast or partial broadcast message to provide information regarding the change in status reporting to multiple devices. In an embodiment, this control message may include a value to indicate that status reporting is to be at a minimal level. Such value may be of different forms, e.g., a code to identify a type of status reporting scheme to be used. In other cases, the control message may include various fields including an identification of a type of status reporting, e.g. poll-based or unsolicited, as well as a frequency of the status reporting. Note that the information may be in the form of a time period in which the device is to send the status messages.

Still referring to FIG. 3, instead if it is determined that there is an active user interface connected to the network controller, control passes from diamond 310 to diamond 330. At diamond 330 the network controller may determine whether this active user interface is local. More specifically, the network controller may determine whether the user interface is present within the wireless network itself. For example, in the home automation network context, a user may be at home and seeking to access information about the network, e.g., to check status or perform a command. As one example, the determination that the active user interface is local may be based on an indication that a request from the user interface was received wirelessly in the network controller from the network, rather than the Internet or other remote connection.

In this instance where it is determined that the active user interface is locally present within the wireless network, control passes to block 340. At block 340, status report messaging may be controlled to be sent at a middle level. As discussed above, such reporting may include both unsolicited status reports from devices as well as status reports received in response to poll requests.

Understand that this middle level of status reporting may vary depending on implementation. With the different levels of status reporting described herein, this middle level may be higher than the minimum level but not as high as a maximum level (described below). This middle level, in one embodiment, may be implemented by instructing devices to communicate status information to identify a correct state, but to do so at a relatively low rate. For example, in this mode the network controller may control status reporting to be sent from devices, e.g., on the order of every 10 seconds. In this way, network traffic may be significantly reduced, enabling a command request that the user issues via the local user interface to be delivered with a low latency, e.g., on the order of a second or less. Note that in contrast to a minimum level, in this middle level, polling also may occur such that the network controller issues poll requests to devices for status information. However, such poll requests may be sent at a reduced rate, e.g., every 10 to 30 seconds, taking the number of nodes and the bandwidth of the network into consideration, as one example.

With this dynamic status report rate control, a good user experience may be realized. Instead, without an embodiment should the network be crowded with status messages, command communications may be delayed, causing user frustration. This is especially the case in which a user continues to actuate command buttons on the user interface in the absence of a requested operation not yet being performed, e.g., changing lighting conditions or so forth.

Still with reference to FIG. 3, instead if it is determined that the active user interface is not locally present, control passes to block 350. At block 350 status report messaging may be controlled to occur at a maximum level. As an example, the network controller may send control messages to cause devices to provide their status at a relatively high rate, e.g., every 1 to 5 seconds in an example. In addition, poll requests also may be sent out at a higher rate, e.g., every 1 to 5 seconds.

In this mode of operation, where the active user interface is remote from the wireless network, the interface may be updated near instantly with regard to status updates. However, should this remote user seek to perform a control request, longer latency for effecting the request may occur. But since the user is not present in the environment, a latency delay that is on the order of 10 or more seconds is not noticeable to the user, in contrast to the case where the user interface and user are present locally and the user is aware of how long a requested operation takes to occur.

While not shown in the high level view of FIG. 3, understand that additional or different modes may be present in other implementations. For example, rather than making a determination based on an active user interface, a rules engine may cause a change in status reporting. The rules engine may be present within the network controller or may be present in the cloud.

A rules engine-based control may be based on a trigger condition. For example, assume the rules engine is configured to perform an action in response to this trigger condition. As one simple example, assume a motion sensor detects user motion. Further assume that this motion sensor is closely located with one or more smart lighting devices. The rules engine may be configured, in response to detection of motion, to cause the one or more smart lighting devices to be powered on. Thus to ensure a low latency for control messages, the rules engine, upon detection of this trigger condition, also may cause status report messaging rate to be updated as described herein. More specifically, for this particular example when seeking to communicate control messages with low latency, status messaging may be controlled to be at a lower level, e.g. a middle level such as occurs when a local active user interface is detected. In some embodiments, it may be possible for the rules engine to directly send control messages to the various nodes to update status message reporting. In other cases, the rules engine may send a request to a network control circuit, which may include a dynamic messaging control circuit as described above regard to FIG. 2. Responsive to this request from the rules engine, the dynamic messaging control circuit may update status message reporting, as described above.

Figure 4:
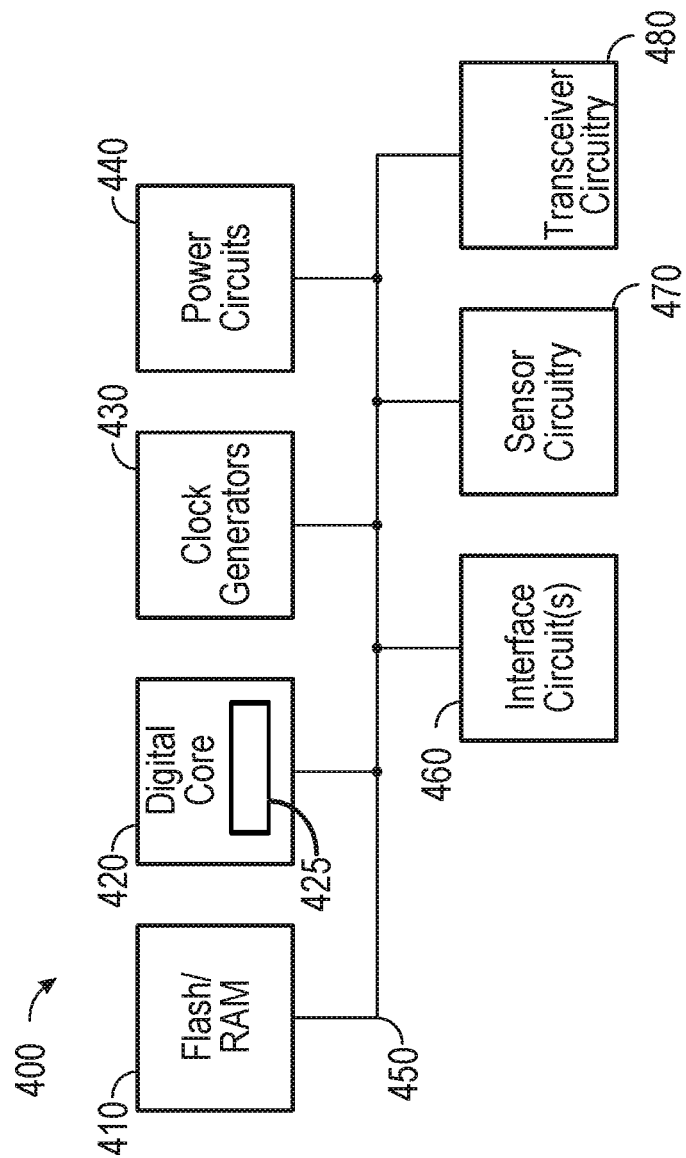
FIG. 4 is a block diagram of a device in accordance with an embodiment.

Referring now to FIG. 4, shown is a block diagram of a representative device 400 which may be incorporated into a wireless network as a node. And as described herein, this device may have its status messaging dynamically controlled by a network controller such as a universal protocol gateway. In the embodiment shown in FIG. 4, device 400 may be a sensor, actuator, controller or other device that can be used in a variety of use cases in a wireless control network, including sensing, metering, monitoring, embedded applications, communications applications and so forth.

In the embodiment shown, device 400 includes a memory system 410 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions for dynamically controlling a rate of status messaging, in response to a command message received from a network controller, as described herein.

Memory system 410 couples via a bus 450 to a digital core 420, which may include one or more cores and/or microcontrollers that act as a main processing unit of the device. As shown, digital core 420 includes a configuration storage 425 which may be implemented as a plurality of registers. In an embodiment, at least one of these configuration registers may store messaging rate control information. As described herein this information may identify a rate at which status messages are to be sent to a network controller. In response to receipt of updated messaging rate control information, digital core 420 may cause device 400 to send status messages at a different rate, e.g., at a lower rate when no active user interface is detected, and instead at a higher rate in the presence of an active user interface, as described herein. As further shown, digital core 420 may couple to clock generators 430 which may provide one or more phase locked loops or other clock generation circuitry to generate various clocks for use by circuitry of the device.

As further illustrated, device 400 further includes power circuitry 440, which may include one or more voltage regulators. Additional circuitry may optionally be present depending on particular implementation to provide various functionality and interaction with external devices. Such circuitry may include interface circuitry 460 which may provide interface with various off-chip devices, sensor circuitry 470 which may include various on-chip sensors including digital and analog sensors to sense desired signals, such as for motion sensing or so forth.

In addition as shown in FIG. 4, transceiver circuitry 480 may be provided to enable transmission and receipt of wireless signals, e.g., according to one or more local area wireless communication schemes, such as Zigbee, Bluetooth, Z-Wave, Thread or so forth. Understand while shown with this high level view, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A gateway comprising:
a radio circuit having a plurality of wireless protocol circuits to communicate according to a plurality of wireless communication protocols, each to communicate wirelessly with one or more nodes present in a wireless network according to one of the plurality of wireless communication protocols;
an interface circuit to couple to one or more cloud-based devices via another network; and
a controller coupled to the interface circuit, the controller comprising a control circuit to control the wireless network, wherein in response to detection of an active user interface for the wireless network, the control circuit is to dynamically update a rate of status report messaging to be communicated from at least one of a plurality of nodes present in the wireless network, the controller to update the rate of status report messaging further based at least in part on a location of the active user interface, wherein:
at a maximum level of the rate of status report messaging when the active user interface is remotely located from the wireless network, the controller is to poll the at least one of the plurality of nodes for status information at a first polling rate;
at a second level of the rate of status report messaging, the controller is to poll the at least one of the plurality of nodes for status information at a second polling rate less than the first polling rate; and
at a minimum level of the rate of status report messaging when no active user interface is detected, the controller does not poll the at least one of the plurality of nodes for status information.

2. The gateway of claim 1, wherein the control circuit is to dynamically update the rate of status report messaging of the at least one of the plurality of nodes to the maximum level in response to the detection of the active user interface being remotely located from the wireless network.

3. The gateway of claim 2, wherein the control circuit is to dynamically update the rate of status report messaging of the at least one of the plurality of nodes to the second level, the second level less than the maximum level in response to the detection of the active user interface being present within the wireless network.

4. The gateway of claim 3, wherein the control circuit is to dynamically update the status report messaging level of the at least one of the plurality of nodes to the minimum level when no active user interface is detected.

5. The gateway of claim 1, wherein the control circuit comprises a network configuration circuit to send a control message to dynamically update the rate of status report messaging.

6. The gateway of claim 5, wherein the control message comprises a first value to indicate the rate of status report messaging.

7. The gateway of claim 1, wherein the control circuit further comprises an update configuration circuit, when no active user interface is detected, to cause an update to a firmware of the at least one of the plurality of nodes, wherein the update configuration circuit is to prevent the firmware update when the active user interface is detected.

8. The gateway of claim 1, wherein in response to a command from the active user interface, the controller is to send a control message to a first node of the plurality of nodes to cause an operation in the first node, wherein the control message is to be received in the first node with a reduced latency due to the dynamic update to the rate of status report messaging, the dynamic update to the rate of status report messaging to reduce network traffic in the wireless network.

9. The gateway of claim 1, wherein the control circuit is to dynamically update the rate of status report messaging of the at least one of the plurality of nodes in response to a request from a rules engine, based on a trigger condition.

10. The gateway of claim 9, wherein in response to a command from the rules engine, the controller is to send a control message to a first node of the plurality of nodes to cause an operation in the first node, wherein the control message is to be received in the first node with a reduced latency due to the dynamic update to the rate of status report messaging, the dynamic update to the rate of status report messaging to reduce network traffic in the wireless network.

11. The gateway of claim 1,
wherein in response to the detection of the active user interface for the wireless network, the control circuit is to send a rate control message to at least one of the plurality of devices to cause the dynamic update to the rate of status messaging of the at least one of the plurality of devices, to prioritize control messaging over status messaging.

12. The gateway of claim 1, wherein in response to a command from the active user interface, the controller is to send a control message to a first device of the plurality of devices to cause an operation in the first device, wherein the control message is to be received in the first device with a reduced latency due to the dynamic update to the rate of status messaging, the dynamic update to the rate of status messaging to reduce network traffic in the wireless network.

13. At least one non-transitory computer readable storage medium comprising instructions, which when performed by a network controller coupled to one or more cloud-based devices via a first network cause the network controller to:

identify, in the network controller of a wireless network, an active user interface connected to the network controller;

in response to identifying the active user interface, send control messages to a plurality of devices of the wireless network to cause the plurality of devices to update a rate of status messaging reporting, wherein the rate of status messaging reporting is to be at a first level when the active user interface is present within the wireless network and at a second level when the active user interface is remote from the wireless network, the second level higher than the first level, and:
when the active user interface is present within the wireless network, poll the plurality of devices for status information at a first polling rate; and
when the active user interface is remote from the wireless network, poll the plurality of devices for status information at a second polling rate, the second polling rate greater than the first polling rate;

thereafter, identify a lack of the active user interface connected to the network controller; and
in response to identifying the lack of the active user interface, send second control messages to the plurality of devices to cause the plurality of devices to update the rate of status messaging reporting to a minimum level and not send poll requests to the plurality of devices.

14. The at least one non-transitory computer readable storage medium of claim 13, further comprising instructions that when executed cause the network controller, in response to identifying the lack of the active user interface, to perform a firmware update to at least one of the plurality of devices.

15. The at least one non-transitory computer readable storage medium of claim 13, further comprising instructions that when executed cause the network controller to receive an acknowledgment from a first device to acknowledge receipt of one of the control messages, and update a status table in response to the acknowledgment.

16. The at least one non-transitory computer readable storage medium of claim 13, further comprising instructions that when executed cause the network controller to send another control message to a second device to cause the second device to update the rate of status messaging reporting, in absence of an acknowledgment from the second device of one of the control messages.

* * * * *